June 17, 1941. W. A. TICKNOR Re. 21,836

FLUE STRUCTURE

Original Filed Oct. 6, 1936

INVENTOR.
WINTON A. TICKNOR
BY Dorsey & Cole
ATTORNEYS.

Reissued June 17, 1941

Re. 21,836

UNITED STATES PATENT OFFICE 21,836

FLUE STRUCTURE

Winton A. Ticknor, Corning, N. Y., assignor, by mesne assignments, to Corning Glass Works, Corning, N. Y., a corporation of New York Original No. 2,103,602, dated December 28, 1937, Serial No. 104,281, October 6, 1936. Application for reissue June 7, 1940, Serial No. 339,407

15 Claims. (Cl. 263—51)

This invention relates to checker column structures for use in regenerative furnaces used in the glass, metallurgical and similar industries. In structures of this type it is common practice to pass the medium to be heated, such as the air supply required for proper combustion, through one of two regenerative flue structures and the gaseous products of combustion through the other. When the refractory material of the latter flue structure has become sufficiently heated the direction of flow is reversed, the reversal occurring periodically so that the one structure is always being heated by the products of combustion while the other is giving up the heat stored therein to the heating medium and the air being supplied for combustion purposes.

In the operation of glass tank furnaces the high temperatures maintained cause boric acid compounds, soda, potash, lead oxide, etc., to volatilize and pass down into the regenerative checker flues. For minimum fuel consumption the checker flues must be so designed that the inlet air is at the maximum possible temperature as it enters the tank with the heating medium. Also, the outgoing gases must be cooled off as thoroughly as possible, interchanging the heat completely with the checker brick. Consequently, the bottom of the checker piles must be as cold as the limitation of chimney height will permit.

Under the above conditions, in the melting of certain glass compositions, the volatilized chemicals from the melting glass condense on walls of the checker columns near the bottom where it has a very destructive action on the ceramic material from which the checker columns are constructed. As a result, after a limited period of operation, the lower parts of the columns are weakened until finally they collapse, making it necessary to shut down the furnace and rebuild the columns.

An object of this invention is an efficient checker-work structure for use with glass melting furnaces and the like, which will outlast structures heretofore used for similar purposes.

A feature of the present invention embodies the construction of checker columns of finned units having a very substantial area of cross section, each having a maximum of surface area for the absorption and dissipation of heat as the gases pass them, and in the arrangement of the respective columns in such a manner as to permit the free intermingling of the passing gases around the fins of each unit so that a flue structure of maximum efficiency is obtained.

In the drawing—

Figure 1:
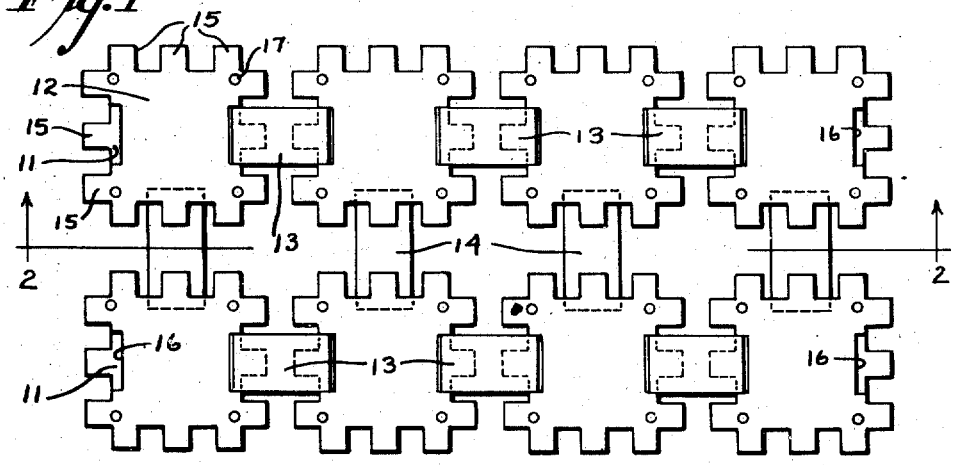
Fig. 1 is a plan view of a group of checker columns embodying the invention.
Figure 2:
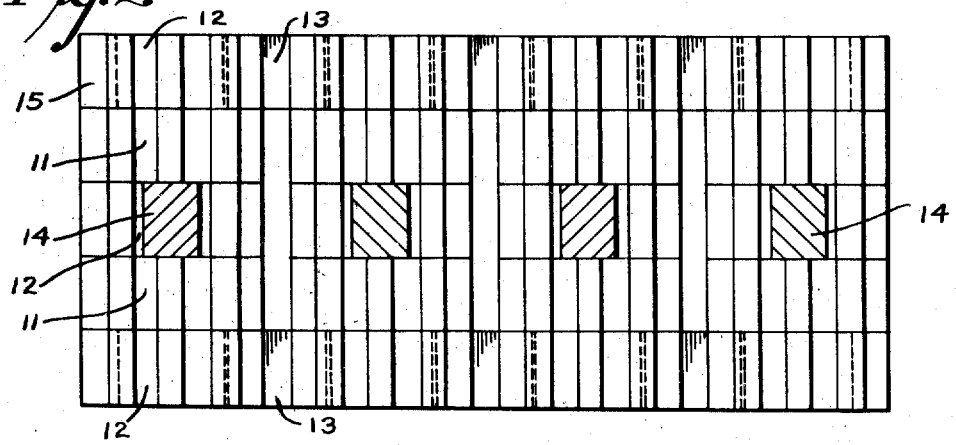
Fig. 2 is a sectional elevation taken on line 2—2 of Fig. 1.
Figure 3:
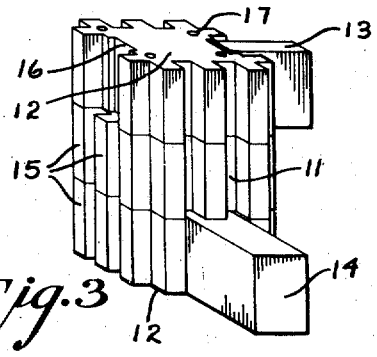
Fig. 3 is a perspective view of a few assembled units of one checker column.

Each column of the assembly, illustrated in Figs. 1, 2 and 3, is composed of two configurations of checker brick units 11 and 12 connected to the adjacent columns by the bricks 13 and 14 of two lengths.

The units 11 are symmetrical on all four sides and have three fins 15 extending from each side thereof, while the units 12 also have three fins 15 on two of the opposite sides thereof, the remaining two oppositely disposed sides having the center fin omitted and being further provided with a shallow channel 16 for receiving one of the tie bricks 13 and 14. In a unit such as 11, consisting, for example, of a solid brick-like mass of refractory material three inches high and five inches square with three one-inch fins equally spaced along each side thereof, the over-all width of the unit is increased to only seven inches, while the wall area is increased from 60 to 132 square inches, whereas a plain block three inches high and seven inches square only has a wall surface area of 84 square inches. It will be apparent, therefore, that the wall surface of unit 11 is over one and one-half times greater than that of a plain block of the same perimeter. To assist in the alignment of the units 11 and 12 when piled one upon another, the upper surfaces of these units are provided with bosses 17 which are in alignment with corresponding indentations on their bottom surfaces so that when the units are piled one upon another the bosses will register with the indentations in the bottom surfaces of the tier above.

When assembling the checker columns within the walls of an appropriate flue structure (not shown), the first tiers of the respective columns are ordinarily composed of units 12 arranged in spaced relation as determined by the tie bricks 13 and 14 used, although if desired the first tier may be composed of units 11. Only units 12 and cooperating tie bricks 13 and 14 are ordinarily used in as many subsequent tiers of the columns as are considered necessary to give the respective columns the desired rigidity. However, the more frequent use of units 12 and cooperating tie bricks 13 or 14, or tie bricks of other lengths, may be resorted to to vary the spacing in certain locations in the flue to furnish the degree of restriction or turbulence desired.

In the assemblies shown in Figs. 1, 2, and 3, the columns are made up of alternate tiers of units 12 and 11. The units 12 of the first tier and each subsequent fourth tier is so arranged that the tie bricks 13 between them serve to properly space and tie together the columns from left to right, while the third and each subsequent fourth tier of units 12 is so arranged that tie bricks 14 between them serve to properly space and tie together the columns from front to back.

With the foregoing arrangement, each checker brick column is substantially full surrounded by air space, the number of tie bricks required being so few as to offer little obstruction to the free intermingling of gases as they pass through the flue.

With the large surface and supporting area provided by the units 11 and 12 and the comparatively small amount of the central portion of such area exposed to the flue gases, an efficient and long lasting structure is produced.

Figure 4:
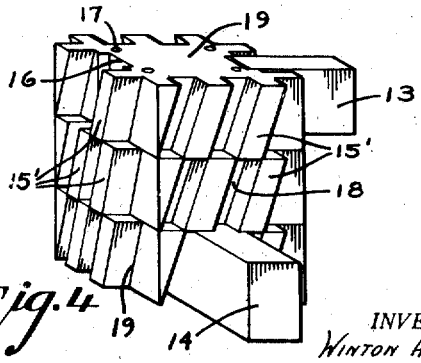
Fig. 4 is a view similar to Fig. 3 showing use of a modified form of checker brick units.

The modified form of checker units 18 and 19 (Fig. 4) differ from units 11 and 12 only in that the fins 15′ run diagonally instead of vertically, and may be assembled into columns and arranged in a flue structure as are the units 11 and 12. However, it will be noted from an inspection of the drawing that fins 15′ run across the units 18 and 19 at such an angle that the ends of the fins 15′ thereof terminate adjacent an open space or in a flute between adjacent fins or the similar unit above or below it. In an assembly of column structures, made up of the units 18 and 19 and using the same spacing bricks 13 and 14 to tie the respective columns together, a more turbulent path for the flow of gases is provided, and more surface of each unit, i. e., the ends of all fins of each unit, are also exposed to the passing gases.

It is not essential to the practice of the invention to employ two kinds of units. As an alternative, all of the units may be of the type such as 12 or 19, and spacer bricks used only between such correspondingly arranged units of adjacent columns as are considered necessary to obtain the required rigidity and degree of turbulence. In such an arrangement the units designed to support the spacer bricks should be rotated ninety degrees with respect to the next higher course in which the spacer bricks are inserted.

Although only two particular forms of units embodying the invention have herein been illustrated and described, it is to be understood that obvious variations of construction may be resorted to without deviating from the spirit and scope of my invention as hereinafter claimed.

What I claim is:

1. In a regenerative furnace flue structure, a plurality of solid refractory units piled one upon another to form checker columns and being provided with projecting fins which increase the side wall area, the fins of superposed units being in vertical alignment and means cooperating only with occasional units for tying the columns together in a definite spaced relation with respect to each other, the remaining units being so spaced with respect to the other that the entire side wall area thereof remains exposed to gases passing through the flue.

2. In a regenerative flue structure, a plurality of solid refractory units piled one upon another to form uniformly spaced checker columns, said units being provided with laterally projecting fins adapted to register with the fins of vertically adjacent units to increase the side wall area and bearing area of the column and means cooperating with units of alternate layers for tying the respective columns together.

3. In a heat exchange structure for regenerative furnaces, a plurality of solid refractory units piled one upon another to form parallel columns arranged in spaced relation to each other throughout their full height to form vertically extending passages for gas, said columns including units having a plurality of spaced integral fins resting upon one another and extending into the intercolumnar spaces whereby the surface and bearing areas of said columns are materially increased.

4. In a heat exchange structure for regenerative furnaces, a plurality of solid refractory units piled one upon another to form isolated columns, said units being provided with outwardly projecting spaced, parallel fins adapted to register in vertical alignment with fins on associated units to form vertically extending fins coextensive in height with said columns and surrounded on three sides by flue spaces, and means extending between certain of said units for holding the respective columns in spaced parallel relation.

5. In a regenerative flue structure, heat exchange units each composed of a solid mass of refractory material the side walls of which are provided with vertical projecting fins which increase its side wall area to not less than one and one-half times that of a similarly shaped plain mass without fins but having the same cross sectional area and height, the units being piled one upon another with projecting fins of each registering with those of vertically adjacent units to increase the bearing area of superposed units, the major portion of the units being each so spaced that the side wall areas thereof remain exposed to gases passing vertically through the flue.

6. In a regenerative flue structure, a plurality of spaced refractory columns composed of separate solid refractory units so disposed that a majority of the units are exposed on four sides to the surrounding flue gases, each of said columns having vertically disposed fins on the side walls thereof and being so arranged that the space for the passage of flue gases includes all side wall surfaces of each such fin.

7. In a regenerative flue structure, a solid core checker column including a stack of heat exchange units a sufficient number of which have fins integral therewith to increase the side surface area thereof to more than double the area the core would have without the fins, said units resting on one another with fins in vertical alignment, said column being substantially entirely surrounded by flue gas spaces.

8. In a regenerative flue structure, a plurality of checker columns each comprising a solid mass of material spaced with respect to each other and formed of superposed solid refractory blocks provided with vertical fins which register with each other throughout the height of each column to increase its bearing area, and separate non-integral spacing and bracing units for said columns.

9. In a heat exchange structure for regenerative furnaces and the like, a plurality of units arranged in columns side by side in substantially fully spaced relation to each other, the units of each column comprising solid masses each having fins projecting diagonally across the side walls thereof.

10. In a regenerative flue structure, a plurality of checker brick columns each composed of a series of checker brick units having diagonally disposed fins on their side walls and so assembled in the columns that the ends of substantially all fins of each column remain exposed to gases passing the columns, and the respective columns being so arranged in spaced relation with respect to one another that the space for the passage of gases also includes the area adjacent all side wall surfaces of each fin.

11. In a regenerative flue structure, spaced checker columns each composed of finned wall units assembled one upon another, certain units of each column having channels therein arranged above the fins of the units immediately below them and means entering the channels and extending between the units for maintaining the columns in spaced relation.

12. In a regenerative flue structure, a plurality of checker columns arranged in spaced relation to one another and each composed of successive tiers of two kinds of checker units, alternately arranged in such columns and each having a plurality of fins on its side walls, one kind of unit having channels in two of its opposite side walls and each alternative one of which in each column has its channeled sides facing in a direction differing from that faced by the channels of the similar units with which they alternate, and spacing means supported by a portion of the body and one of the fins of the other kind of units in such columns, said means extending between the columns to maintain them in spaced parallel relation throughout their height.

13. In a regenerative flue structure, heat exchange columns each comprising a stack of solid refractory units whose side walls are provided with integrally formed projecting fins which increase their side wall area to at least one and one-half times that of similarly shaped plain masses without fins but having the same cross sectional area and height, said units resting on one another with fins in vertical alignment and each column being so spaced and tied with respect to other of the columns that substantially the entire side wall area of each column remains exposed to gases passing through the flue.

14. In a regenerative flue structure, heat exchangers each comprising a stack of solid refractory units whose side walls are provided with solid fins which are formed integrally with the solid units and project laterally therefrom and materially increase their side wall area, the units being piled one upon another with projecting fins of each registering with those of vertically adjacent units to increase the bearing area of superposed units and of the exchangers which they form, and each exchanger being so spaced from and tied to the exchanger adjacent to it that substantially the entire side wall area of each remains exposed to gases passing through the flue.

15. In a regenerative flue structure, heat exchangers each composed of solid units of refractory material the side walls of which are provided with vertical projecting fins which increase its side wall area to not less than one and one-half times that of a similarly shaped plain mass without fins but having the same cross sectional area and height, the units being piled one upon another with projecting fins of each registering with fins of vertically adjacent units to increase the bearing area of superposed units, the major portion of the units of each exchanger being so spaced from units of other of the heat exchangers that the side wall areas thereof remain exposed to gases passing vertically through the flue.

WINTON A. TICKNOR.